(12) United States Patent
Porzel et al.

(10) Patent No.: US 8,155,849 B2
(45) Date of Patent: Apr. 10, 2012

(54) HYDRAULIC ACTUATING DEVICE FOR AN AUTOMOTIVE FRICTION CLUTCH

(75) Inventors: Rainer Porzel, Ebern (DE); Otto Kadlac, Ebern (DE); Norbert Oberlack, Höchstadt (DE); Karl Peuker, Ebern (DE); Geza Zsari, Ebern (DE)

(73) Assignee: FTE automotive GmbH, Ebern (DE)

( * ) Notice: Subject to any disclaimer, the term of this patent is extended or adjusted under 35 U.S.C. 154(b) by 1333 days.

(21) Appl. No.: 10/593,789

(22) PCT Filed: Mar. 23, 2005

(86) PCT No.: PCT/EP2005/003081
§ 371 (c)(1),
(2), (4) Date: May 25, 2007

(87) PCT Pub. No.: WO2005/093277
PCT Pub. Date: Oct. 6, 2005

(65) Prior Publication Data
US 2008/0215219 A1    Sep. 4, 2008

(30) Foreign Application Priority Data
Mar. 24, 2004    (DE) .......................... 10 2004 015 185

(51) Int. Cl.
*G06F 7/00* (2006.01)
*G06F 17/00* (2006.01)

(52) U.S. Cl. .......................................... 701/68; 701/67

(58) Field of Classification Search ............ 701/67, 701/68; 192/3.51–3.53, 3.55–3.57; 475/43; 477/39, 57, 62, 70, 166, 180
See application file for complete search history.

(56) References Cited

U.S. PATENT DOCUMENTS

| | | | |
|---|---|---|---|
| 4,918,921 A | 4/1990 | Leigh-Monstevens et al. | |
| 5,002,166 A | 3/1991 | Leigh-Monstevens et al. | |
| 5,094,079 A | 3/1992 | Leigh-Monstevens et al. | |
| 6,116,391 A * | 9/2000 | Kremmling et al. | 192/3.58 |
| 6,290,045 B1 | 9/2001 | Klatt | |
| 6,883,658 B2 | 4/2005 | Reul et al. | |
| 2002/0134637 A1* | 9/2002 | Salecker et al. | 192/54.1 |
| 2003/0024789 A1* | 2/2003 | Vonnegut et al. | 192/84.6 |
| 2003/0221930 A1* | 12/2003 | Steinel et al. | 192/83 |
| 2005/0000772 A1 | 1/2005 | Wohner | |
| 2008/0091324 A1* | 4/2008 | Werner et al. | 701/68 |

FOREIGN PATENT DOCUMENTS

| | | |
|---|---|---|
| DE | 198 12 770 A1 | 10/1999 |
| EP | 0 324 553 A1 | 7/1989 |
| EP | 1 531 279 A1 | 5/2005 |
| GB | 2 231 933 A | 11/1990 |
| WO | WO 2005/047722 A1 | 5/2005 |

* cited by examiner

Primary Examiner — Jeffrey Shapiro
(74) *Attorney, Agent, or Firm* — Reising Ethington P.C.

(57) ABSTRACT

A hydraulic actuating device (10) for an automotive friction clutch (12), has a master cylinder (14) whose master piston (16) can be impinged upon with a master force ($F_G$) via an actuating mechanism (18) and can be displaced by a master travel ($S_G$), and a slave cylinder (20) with a slave piston (22) which is hydraulically connected in series to the master piston via a liquid column and is functionally linked with a clutch-release member (24) of the automotive friction clutch. The actuating device may be provided with an adjusting unit (26) may have an adjusting piston (28). The adjusting piston is hydraulically connected in series to the master piston and can be impinged upon with a force and displaced via a transmission (30) that is driven by an electric motor. The actuating device further has a control unit (C) which is used to control the adjusting unit especially subject to a master variable ($F_G$; $S_G$).

21 Claims, 7 Drawing Sheets

HYDRAULIC ACTUATING DEVICE FOR AN AUTOMOTIVE FRICTION CLUTCH

TECHNICAL FIELD

The invention relates to an actuating device for an automotive friction clutch according to the preamble to claim 1 such as is used on a mass-scale in the automobile industry.

PRIOR ART

A generic hydraulic actuating device for an automotive friction clutch as described, for example, on page 261 of the applicant's "Handbook of hydraulic brake and clutch actuation systems" ("Handbuch der hydraulischen Bremsanlage und Kupplungsbetätigung"), Issue 98, has a master cylinder connected to a compensating reservoir filled with hydraulic fluid whose master piston can be impinged upon with a force and displaced by means of an actuating mechanism in the form of a clutch pedal. The master cylinder is hydraulically connected by a pressure line to a slave cylinder which may be a "conventional" slave cylinder with a cylindrical piston or, however, a so-called "central releasing device" with an annular piston arranged concentrically relative to the transmission input shaft. When the clutch pedal is depressed, the pressure generated in the master cylinder is transmitted via the liquid column in the pressure line to the slave cylinder. As a result, a clutch-release member—in the case of a conventional slave cylinder, the release lever functionally connected to the clutch's release bearing, or, in the case of the central release device, the release bearing—is impinged upon with an actuation force via the slave cylinder piston in order, via a release mechanism, to separate the clutch pressure plate from the clutch driving disc and hence the engine from the automotive vehicle's transmission.

Recently, there has been an increasing trend toward providing automotive vehicles with more powerful engines. As a result, modern automotive friction clutches not infrequently have torques of more than 300 Nm. To release clutches with such large dimensions, it is necessary to apply relatively high actuation forces. The use of a conventional hydraulic actuation device for this results in a high force being required on the clutch pedal. However, the requirement for high pedal forces of this kind to release the clutch is undesirable, particularly in passenger cars.

Although hydraulic actuating devices for automotive friction clutches are known in the prior art in which the master piston of the master cylinder can always (for example U.S. Pat. No. 4,918,921) or optionally (for example U.S. Pat. No. 5,002,166) be impinged upon with a force via a transmission driven by means of an electric motor and displaced, in the case of the servo operation of these actuating devices, the operator does not receive any feedback at the clutch pedal representative of the respective state of release of the friction clutch.

Finally, a master cylinder actuated by an electric motor similar to the aforementioned prior art for a hydraulic clutch actuating device can be found in U.S. Pat. No. 5,094,079. However, the slave cylinder group disclosed herein requires inter alia a considerable amount of space which is not always available on the pedal bracket for the clutch pedal in modern automotive vehicles.

The object of the invention is to provide a hydraulic actuating device which is as simple and compact as possible for an automotive friction clutch and which can also be used for the actuation of clutches which transmit relatively high torques without this requiring higher pedal forces or pedal travels than the generic hydraulic actuating device.

According to the present invention, there is provided a hydraulic actuating device for an automotive friction clutch, with a master cylinder having a master piston, which can be impinged upon with a master force ($F_G$) via an actuating mechanism and can be displaced by a master travel ($S_G$) as master variables, and a slave cylinder with a slave piston which is hydraulically connected in series to the master piston via a liquid column, which is functionally linked with a clutch-release member of the automotive friction clutch, wherein an adjusting unit comprises an adjusting piston hydraulically connected with the master piston by one out of being connected in series and parallel thereto, which can be impinged upon with a force and displaced via a transmission that is driven by an electric motor and a control unit, which can control the electric motor subject to one of the master variables ($F_G$, $s_G$) and a variable ($p_G$) substantially proportional thereto, in order in the case of the connection in series of the master piston and the adjusting piston specifically to increase the force acting on the liquid column by impinging the adjusting piston with a force and in the case of the parallel connection of the master piston and the adjusting piston specifically to increase the volume of the liquid by the displacement of the adjusting piston.

DESCRIPTION OF THE INVENTION

A hydraulic actuating device for an automotive friction clutch comprising a master cylinder, whose master piston can be impinged upon with a master force via an actuating mechanism and can be displaced by a master travel as master variables and a slave cylinder with a slave piston which is hydraulically connected in series with the slave piston via a liquid column and is functionally linked with a clutch-release member of the automotive friction clutch, comprises according to the invention an adjusting unit that comprises an adjusting piston which is hydraulically connected in series to the master piston or parallel thereto, which can be impinged upon by a force and displaced via a transmission driven by an electric motor and a control unit, by means of which the electric motor may be controlled subject to one of the master variables or a variable substantially proportional thereto, in order, in the case of the series connection of the master piston and the adjusting piston by the impingement of force on the adjusting piston specifically to increase the force acting on the liquid column or in the case of the parallel connection of the master piston and the adjusting piston by the displacement of the adjusting piston specifically to increase the volume of the liquid column.

In the case of the connection in series of the master piston and the adjusting piston, the adjusting unit therefore permits the specific increase of the force applied to the liquid column between the master piston and the slave piston via the actuating mechanism, for example a clutch pedal, resulting in an increase in the pressure level in the liquid column present at the slave piston. In other words: with this alternative, the release force applied via the slave piston to the clutch comprises two force components, namely a first force component applied by the operator via the actuating mechanism and a second force component which is contributed by the adjusting unit. As a result, it is possible, due to the resulting increase in the pressure level in the liquid column present at the slave piston, while retaining a conventional slave cylinder, to actuate clutches which are required to transmit relatively high torques and consequently require high release forces, without—unlike the case with conventional actuating devices— this requiring a change to the forces to be applied for this by the operator to the clutch pedal.

In principle, in the case of the connection in series of the master piston and the adjusting piston, there are two conceivable connection variants: on the one hand, the adjusting piston can be arranged between the master piston and the slave piston, on the other, the master piston can be arranged between the adjusting piston and the slave piston. In the first connection variant, the adjusting piston divides the liquid column between the master piston and the slave piston into a master section between the master piston and the adjusting piston and a slave section between the adjusting piston and the slave piston, while with the second connection variant, the master piston divides the liquid column between the adjusting piston and the slave piston into a servo section between the adjusting piston and master piston and a pressure section between the master piston and the slave piston. In both cases, therefore, the circuit is separated by a piston requiring pressure chambers at both sides of the respective piston. With the first connection variant—adjusting piston between the master piston and the slave piston—it may be advantageous to use a conventional, compact master cylinder so that in particular this connection variant is also extremely suitable for a so-called "add on" solution with which, for example, a commercially available, generic actuating device is supplemented according to the invention by an adjusting unit and a control unit and consequently can be retrofitted for the actuation of a clutch required to transmit relatively high torques. This means that it is also conceivable to have modular systems, with a set of slave cylinders, a set of slave cylinders and an adjusting unit with a corresponding control unit, whereby in each case a slave cylinder can be combined one of the master cylinders and in addition optionally with the adjusting unit/control unit assembly thus enabling a whole range of different clutches with different torque transmission capacities to be covered by the actuation side.

With the second connection variant, with the master piston between adjusting piston and the slave piston, it is necessary to use a master cylinder that differs from a conventional actuating device with two pressure chambers. For this, unlike the case with the first connection variant, however, the adjusting unit can be more simply and compactly embodied with only one pressure chamber. In addition, this connection variant is very suitable for installation situations in which, due to the physical proximity of the pedal bracket and the clutch, the master cylinder and the slave cylinder lie very close together and insofar an interpolation of the adjusting unit between the master cylinder and the slave cylinder could possibly create problems.

In the case of the parallel connection of the master piston and the adjusting piston, on the other hand, the adjusting unit permits a specific enlargement of the volume of the liquid column between the master piston and the slave piston, with—unlike the case with conventional actuating devices— substantially the same pressure level in the liquid column. As a result of this, it is possible, while retaining a conventional, compact master cylinder and hence without changing the forces to be applied by the operator to the master cylinder via the clutch pedal, to use a slave cylinder, whose slave piston has a larger hydraulic effective area than that of conventional slave cylinders so that it is possible to apply a greater force to the clutch via the slave cylinder and hence to release clutches which have to transmit relatively high torques without problems.

In addition, common to all connection variants according to the invention is the fact the spatial location of the adjusting unit can advantageously be selected independently of the location of both the master cylinder and the slave cylinder, thus enabling a high degree of flexibility with regard to the possibilities for the arrangement of the adjusting unit. This is in particular advantageous in the case of modern passenger vehicles which usually have a plurality of units to be accommodated in the engine compartment.

Since, in addition, the electric motor of the adjusting unit for the impingement of force or the displacement of the adjusting piston via the transmission by means of the control unit can be controlled subject to one of the master variables, for example the master force or the master travel or a variable substantially proportional thereto, it can always be guaranteed that, on the actuation of the clutch, the adjusting unit contributes a force or volume suitable to ensure that, as far as the pedal feel is concerned, the respective master variable for the operator is no different from the corresponding master variable on the actuation of a conventional hydraulic actuating device, although the clutch released transmits higher torques and consequently requires higher release forces.

Not least, advantages are derived from the fact that, according to the invention, the direct mechanical action of a control motor on the master piston, such as is known, for example, from U.S. Pat. No. 5,094,079 quoted in the introduction, is avoided. On the one hand, therefore, a master cylinder can namely be used with the actuating device according to the invention which does not require an excessively large amount of space at the pedal bracket for the clutch pedal. On the other hand, unlike the case in the prior art, the hydraulic connection between the adjusting unit and the master cylinder ensures that the system is less rigid or that there is a certain "softness" in the system as a result of which there may be a certain delay in the pressure build-up and which can be optionally used to optimize the vibrational behaviour of the hydraulic actuating system.

BRIEF DESCRIPTION OF THE DRAWINGS

There now follows a closer description of the invention and preferred examples of embodiments with reference to the attached schematic diagrams whereby the same or corresponding parts are given the same reference numbers and in which.

DETAILED DESCRIPTION OF THE EXAMPLES OF EMBODIMENTS

FIGS. 1, 5, 7 and 9 each show a hydraulic actuating device 10 for an automotive dry friction clutch—hereinafter referred to as the clutch 12 for short—in its basic position, that is in non-actuated state, in which the clutch 12 is engaged. These actuating devices 10 comprise in a way known per se a master cylinder 14 with a master piston 16, which can be impinged upon with a master force $F_G$ via an actuating mechanism and can be displaced by a master travel $s_G$ as master variables—in the examples of embodiments shown, a clutch pedal 18 and a slave cylinder 20 comprising a slave piston 22 which is hydraulically connected to the master piston 16 via a liquid column and which is functionally linked with a clutch-release member—in the examples of embodiments shown, a release lever 24—of the clutch 12. In addition, common to the actuating devices 10 according to FIGS. 1, 5, 7 and 9 is the fact that they each comprise an electromechanical adjusting unit 26 with an adjusting piston 28, which can be impinged upon with an adjusting force $F_S$ and displaced by an adjusting travel $s_S$ by means of a transmission 30 driven by an electric motor M. While in the example of an embodiment according to FIG. 1, the adjusting piston 28 relative to the slave piston 22 is hydraulically connected in parallel to the master piston 16, in the second to fourth examples of embodiments according to FIGS. 5, 7 and 9, the adjusting piston 28 is hydraulically connected in series to the master piston 16 and the slave piston 22. Finally, all the actuating devices 10 comprise a control unit C by means of which the electric motor M of the adjusting unit 26 can be controlled subject to one of the master variables $F_G$, $s_G$ or a variable substantially proportional thereto in such a way that, as will be explained in greater detail below, in the case of the connection in series of the master piston 16 and the adjusting piston 28 (FIGS. 5, 7 and 9), the impingement of the force on the adjusting piston 28 via the transmission 30 enables the force acting on the liquid column between the master piston 16 and the slave piston 22 to be specifically increased or, in the case of the parallel connection of the master piston 16 and the adjusting piston 28 (FIG. 1), the displacement of the adjusting piston 28 via the transmission 30 enables the volume of the liquid column between the master piston 16 and the slave piston 22 to be specifically increased.

The master cylinder 14 comprises, in a way known per se, a cylinder housing 32, in which the master piston 16 is guided in a sealed way in a longitudinal direction and against the inner peripheral surface of the cylinder housing 32 by means of a sealing means not shown here, whereby the master piston 16 delimits a pressure chamber 34 in a pressure-tight and variable way in the cylinder housing 32. Arranged in the pressure chamber 34, there is a return spring 36—in the examples of embodiments shown, in the form of a helical compression spring—by means of which the master piston 16 is pretensioned in its basic position shown in FIGS. 1, 5, 7 and 9 in which the pressure chamber 34 is hydraulically connected via a tracking line 38 to a reservoir 40 for the hydraulic fluid, so that in the basic position of the master piston 16 inter alia any losses of hydraulic fluid in the hydraulic system are balanced out and it may also be aerated via the reservoir 40.

Provided on the side of the master piston 16 facing away from the pressure chamber 34, there is a piston rod 42, one end of which acts on the master piston 16 and the other end of which is pivoted on the clutch pedal 18. The clutch pedal 18 itself is, a way known per se, swivel-mounted with one end on a pedal bracket 44 of the automotive vehicle, which is only shown schematically in FIGS. 1, 5, 7 and 9 and, at its other end, has a pressure plate 46 by means of which the operator can apply actuation forces to the clutch pedal 18. It is evident that by applying actuation forces to the pressure plate 46 of the clutch pedal 18—usually depressing the clutch pedal 18—with a lever ratio defined by the geometry and the dimensions of the clutch pedal 18 and the spatial position of the hinge points between the clutch pedal 18 and the pedal bracket 44 or the piston rod 42, via the piston rod 42, the operator can generate a specific master force $F_G$ on the master piston 16 and displace this by a specific master travel $s_G$.

In the examples of embodiments shown, the slave cylinder 20 is a "conventional" piston-cylinder arrangement—unlike a so-called "central disengaging device", as described for example in the applicant's DE 102 22 730 A1 which be used as an alternative in this case—with a cylinder housing 48 in which the slave piston 22 is guided in a sealed way in a longitudinal direction and against the inner peripheral surface of the cylinder housings 48 by means of a sealing means which is not shown here in order to delimit a pressure chamber 50 in a pressure-tight and variable way in the cylinder housing 48. On the side of the slave piston 22 facing away from the pressure chamber 50, a pressure rod 52 is secured to the slave piston 22, which acts on the upper end of the release lever 24 in FIGS. 1, 5, 7 and 9 with its end facing away from the slave piston 22.

The actual release lever 24 is in a way known per se swivel-mounted on a relay link 54 which is only indicated schematically in FIGS. 1, 5, 7 and 9 and acts with its lower end in these figures on a release bearing 56 of the clutch 12, which is also only shown schematically. The release bearing 56 is functionally connected via a release mechanism 58 which is also known per se with an axially mobile pressure plate 60, which together with the release mechanism 58 is secured to a flywheel 62, which in turn is attached in a rotation-proof way to a crankshaft 64 of an internal combustion engine (not shown). The release mechanism 58 also comprises pressure springs 66—the actual clutch springs—which, when the clutch 12 is in resting state, press the pressure plate 60 against a driver disc or clutch disc 70 bearing a per se known friction lining and attached in a rotation-proof way to a transmission input shaft 68 and hence press said disc against the flywheel 62 so that when the clutch 12 is in engaged state, there is a friction locking between the flywheel 62, the clutch disc 70 and the pressure plate 60 which ensures that torque transmission takes place from the crankshaft 64 to the transmission input shaft 68.

The slave cylinder 20 also has a preload spring 72 arranged in the pressure chamber 50—in the examples of embodiments shown once again in the form of a helical compression spring—by means of which the slave piston 22 is pretensioned in its resting position as shown in a somewhat exaggerated way in FIGS. 1, 5, 7 and 9 on the far left. As a result, the preload spring 72, whose spring force is selected so that it is not able to surmount the spring force of the pressure springs 66, ensures via the pressure rod 52 and the release lever 24 that the release bearing 56 lies permanently and gently on the further release elements of the clutch 12 so that there is no play between these components. The preload spring 72 therefore also causes the release bearings 56 constantly to follow the rotating components of the clutch 12 which to a large extent prevents the wear of the release bearings 56 when compared to a structure in which the release bearing is accelerated or braked during the release or engaging process.

It is evident that in view of the mutually opposed spring forces of the preload spring 72, the pressure springs 66 and the lever ratios, there is a specific resistance force over the release lever 24 and the release mechanism 58, here called the slave force $F_N$, changing over the stroke or slave travel $s_N$ of the slave piston 22, which has to be surmounted by the impingement of the pressure chamber 50 with a slave pressure $p_N$ in order to move the slave piston 22 in FIGS. 1, 5, 7 and 9 toward the left and hence release the clutch 12, i.e. to separate the pressure plate 60 from the clutch disc 70 and hence the internal combustion engine from the transmission (neither of them shown). FIGS. 4, 6, 8 and 10 show typical curves of this type for the slave pressure $p_N$ or the slave force $F_N$ inherent to the respective clutch 12—also known as clutch characteristics—plotted over the volume increase $\Delta V_N$ of the slave cylinder 20 (FIG. 4), the stroke or master travel $s_G$ of the master piston 16 (FIGS. 6 and 10) and the stroke or adjusting travel $s_S$ of the adjusting piston 28 of the adjusting unit 26 (FIG. 8) for different examples of embodiments of the hydraulic actuating device 10.

The adjusting unit 26 also has a cylinder housing 74, in which the adjusting piston 28 is guided in a sealed way in a longitudinal direction and against the inner peripheral surface of the cylinder housing 74 by means of suitable sealing means, not shown here, so that in all the examples of embodiments, the adjusting piston 28 delimits a pressure chamber 76 in a pressure-proof and variable way on its left side as shown in FIGS. 1, 5, 7 and 9. Arranged in the pressure chamber 76 of the adjusting unit 26 there is a pretensioning spring 78—in the examples of embodiments shown once again in the form of a helical compression spring—which pretensions the adjusting piston 28 in FIGS. 1, 5, 7 and 9 toward the right.

On the right-hand side of the of the adjusting piston 28 in FIGS. 1, 5, 7 and 9, the transmission 30 is fixed in a way not shown in any further detail on or in the cylinder housing 74. In the examples of embodiments shown, the transmission 30 is a spindle drive, or to be more precise a commercial, smooth-running ball screw drive, with a ball screw 80 to which is assigned a spindle nut or which runs in the latter. While the ball screw 80 in a way not shown in any more detail in FIGS. 1, 5, 7 and 9 is secured against twisting in relation to the cylinder housing 74, the spindle nut 82 can be rotated by means of the electric motor M. The electric motor M of the adjusting unit 26 is preferably a brushless dc motor characterized by excellent dynamics, a high degree of efficiency and/or high power density, low wear and hence a long service life, good overload capability, low weight and, not least, low noise generation. With regard to the adjusting unit 26, it should noted from a structural aspect that the pretensioning spring 78 in the pressure chamber 76 attempts to hold the adjusting piston 28 against the left end of the ball screw 80 in FIGS. 1, 5, 7 and 9, which is not firmly connected to the adjusting piston 28.

By means of the control unit, an electrical current of a prespecified current intensity I and voltage U can be applied via power lines 84 to the electric motor M which causes this to rotate the spindle nut 82 about a defined angle of rotation in a defined direction of rotation with a defined torque. The rotational movement of the spindle nut 82 is hereby transformed, subject to the spindle pitch into a translatory movement of the ball screw 80 so that the transmission 30 can generate an adjusting travel $s_S$ on the adjusting piston 28 via the ball screw 80 corresponding to the rotation angle setting of the spindle nut on the adjusting piston 28. In addition, the torque applied to the spindle nut 82 via the electric motor M is transformed subject to the spindle pitch into a adjusting force $F_S$ acting on the ball screw 80, which, when the adjusting piston 28 lies on the ball screw 80, also acts on the adjusting piston 28 and can generate a hydraulic pressure in the pressure chamber 76 of the adjusting unit 26.

In the first example of an embodiment of the hydraulic actuating device 10, the master cylinder 14, the slave cylinder 20 and the adjusting unit 26 are connected to each other according to FIG. 1 as described below. Firstly, there is a hydraulic connection between the master cylinder 14 and the slave cylinder 20, to be more precise the pressure chamber 34 of the master cylinder 14 and the pressure chamber 50 of the slave cylinder 20, by means of a first pressure line 86 in which the liquid column may be displaced between the master piston 16 and the slave piston 22. Then, the adjusting unit 26, to be more precise its pressure chamber 76, is hydraulically connected to the first pressure line 86 via a second pressure line 88 for the parallel connection of the master piston 16 and adjusting piston 28. As a result, the displacement of the adjusting piston 28 via the transmission 30 driven by the electric motor M can specifically increase the volume of the liquid column between the master piston 16 and the slave piston 22. As a result, it is possible, while retaining a master cylinder 14 with conventional dimensions, to enlarge the slave cylinder 20 in such a way that the slave piston 22 has a larger hydraulic effective area so that while substantially retaining the normal pressure level in the pressure chambers 34, 50 of the master cylinder 14 and/or of the slave cylinder 20 and the pressure line 86, a higher slave force $F_N$ can be applied via the enlarged hydraulic effective area of the slave piston 22 which permits the release of clutches 12 whose pressure springs 66 are dimensioned stronger than conventionally for the transmission of higher torques by the clutch 12.

Figure 1:
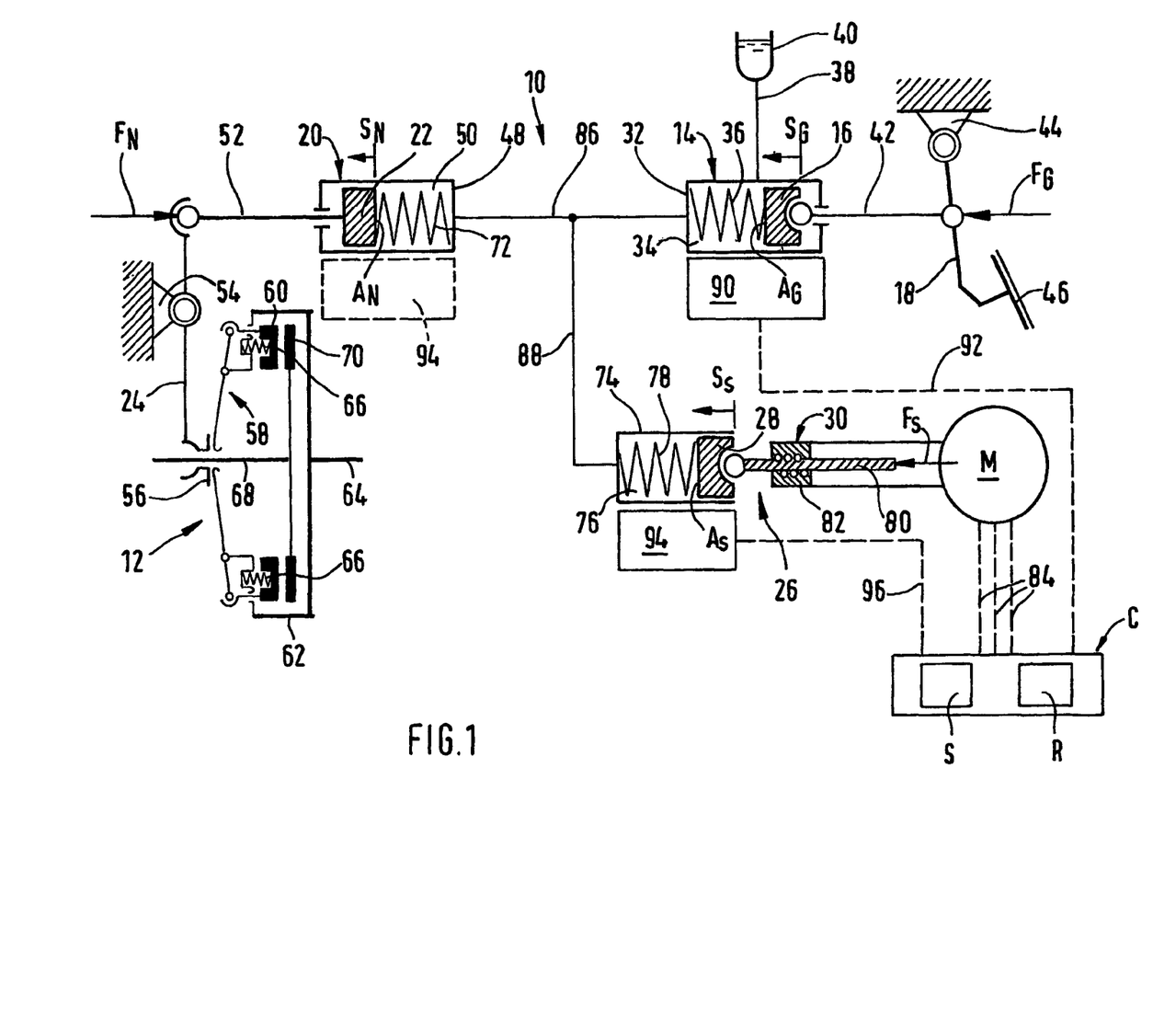
FIG. 1: is a circuit diagram of a hydraulic actuating device according to the invention for an automotive friction clutch according to a first example of an embodiment in which a master piston of a master cylinder is hydraulically connected in parallel to an adjusting piston of an electromechanical adjusting unit relating to a slave piston of a slave cylinder.

As is also shown in FIG. 1, a first sensor device 90 is provided on the master cylinder 14 which is connected via a signal line 92 to the control unit C, i.e. has a signal connection therewith. In addition, a second sensor device 94 is arranged on the adjusting unit 26 which also has a signal connection with the control unit C via a signal line 96. The first sensor device 90 serves in the first example of an embodiment to detect the master travel $s_{Gist}$ as a reference variable for the control of the electric motor M via the control unit C and can, for example, be embodied as described in the applicant's DE 203 15 735 U1. The adjusting travel $s_{Sist}$ of the adjusting piston 28 of the adjusting unit 26 as control variable can be detected by means of the second sensor device 94. The second sensor device 94 can also in principle be embodied as described in the applicant's DE 203 15 735 U1. As indicated in FIG. 1 with dotted lines on the slave cylinder 20, the second sensor device 94 can alternatively be used to detect the slave travel $s_N$ of the slave piston 22 in the slave cylinder 20. However, it is preferable to arrange the second sensor device 94 on the adjusting unit 26 because, as an "add-on" component, this can bring with it (at least) some of the sensors required for the control.

Figure 3:
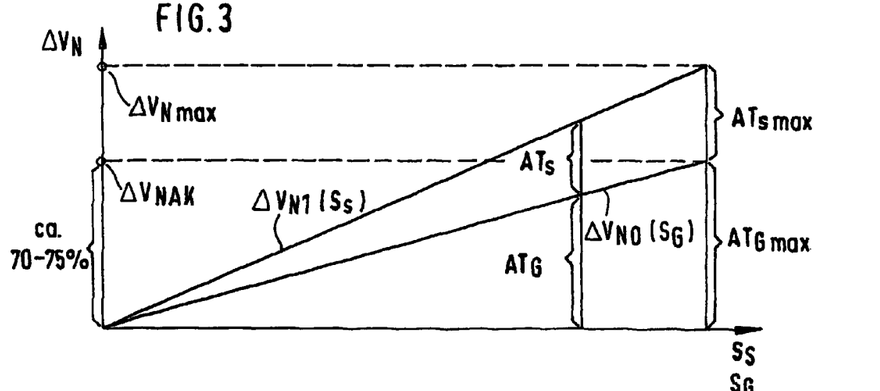
FIG. 3 is a second diagram serving to explain the first example of an embodiment in which the volume increase $\Delta V_N$ of the slave cylinder is plotted as a function of the adjusting travel $s_S$ of the adjusting piston in the adjusting unit or of the master travel $s_G$ of the master piston.
Figure 4:
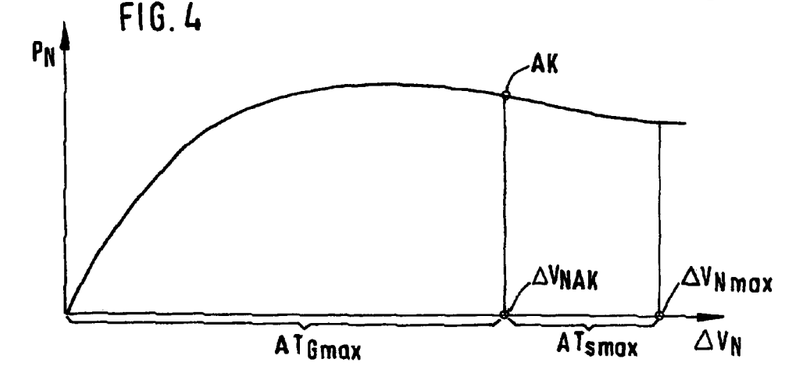
FIG. 4 is a third diagram serving to explain the first example of an embodiment in which the slave pressure $p_N$ prevailing in the slave cylinder is plotted as a function of the volume increase $\Delta V_N$ of the slave cylinder.

As will be explained in more detail below with reference to FIGS. 2 to 4, it is now possible to determine a desired value for the adjusting travel $s_{Ssoll}$ of the adjusting piston 28 (or the slave travel $s_{Nsoll}$ of the slave piston 22) in the control unit C subject to the detected master travel $s_{Gist}$ of the master piston 16 whereupon the determined adjusting travel $s_{Ssoll}$ of the adjusting piston 28 (or slave travel $s_{Nsoll}$ of the slave piston 22) can be adjusted via the electric motor M of the adjusting unit 26 which is controlled by the control unit C as described above.

For this, the control unit C has a computation element R with which the desired value for the adjusting travel $s_{Ssoll}$ of the adjusting piston 28 (or the slave travel $s_{Nsoll}$, of the slave piston 22) can be determined in accordance with the following relationship:

$$s_{Ssoll}=k_U * s_{Gist} \text{ (or } s_{Nsoll}=k_U * s_{Gist})$$

where $s_{Gist}$ is the master travel of the master piston 16 detected by means of the first sensor device 90, and
$k_U$ is a transfer factor stored in a storage element S of the control unit C.

Figure 2:
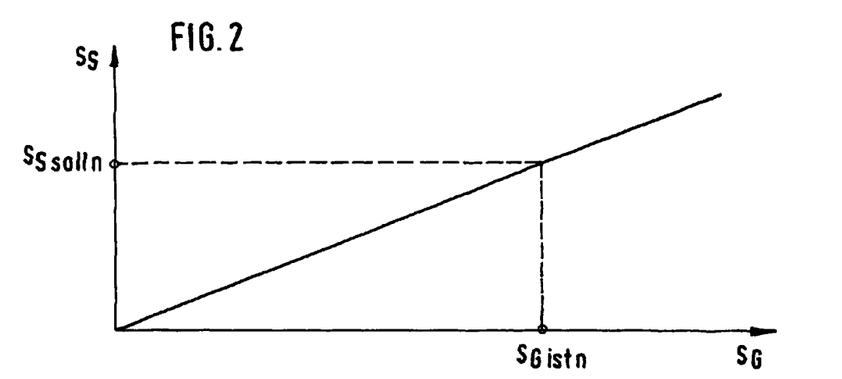
FIG. 2: is a diagram serving to explain the first example of an embodiment in which the adjusting travel $s_S$ of the adjusting piston in the adjusting unit is plotted as a function of the master travel $s_G$ of the master piston in the master cylinder.

If the transfer factor $k_U$ is constant, which is advantageous in view of reducing the complexity of the control unit C or the control exerted thereby, the course of the adjusting travel $s_S$ plotted over the master travel $s_G$ according to FIG. 2 is obtained as a straight line. As shown in FIG. 2, the control unit C therefore assigns a specific master travel $s_{Gistn}$ detected by means of the first sensor device a specific adjusting travel $s_{Ssolln}$ which it is to be adjusted by suitable control of the electric motor M of the adjusting unit 26 so that the actual value for the adjusting travel $s_{Sist}$ detected by means of the second sensor device 94 matches the respective prespecified desired value for the adjusting travel $s_{Ssoll}$. In other words, the adjusting piston 28 of the adjusting unit 26 follows the stroke or master travel $s_G$ of the master piston 16 specified by the operator in a proportional relationship.

As the master travel $s_G$ of the master piston 16 increases, therefore, a greater volume of hydraulic fluid is "pushed" through the adjusting unit 26 in the liquid column between the master piston 16 and the slave piston 22. This is demonstrated by FIG. 3 in which the volume increase $\Delta V_N$ of the slave cylinder 20, that is, starting from the resting position of the slave cylinder 20, the volume of hydraulic fluid flowing through its delivery connection into the pressure chamber 50 of the slave cylinder 20 is plotted over the adjusting travel $s_S$ of the adjusting piston 28 or the master travel $s_G$ of the master piston 16. Hereby, the upper line represents the volume increase $\Delta V_N$ of the slave cylinder 20 obtained on a clutch actuation as a result of the displacement from the pressure chambers 34, 76 of the master cylinder 14 and the adjusting unit 26, while the lower line $\Delta V_{NO}$ represents the volume increase $\Delta V_N$ of the slave cylinder 20 which would be obtained with a clutch actuation solely due to the volume displacement from the pressure chamber 34 of the master cylinder 14 if, for example, there were to be a failure of the adjusting unit 26. It is evident that, with a normal clutch actuation by means of the hydraulic actuation device 10, the volume increase $\Delta V_N$ of the slave cylinder 20 quasi comprises two parts $AT_G$, $AT_S$, namely one part $AT_G$ as a result of the volume displacement from the pressure chamber 34 of the master cylinder 14 and one part $AT_S$ as the result of the parallel volume displacement from the pressure chamber 76 of the adjusting unit 26, whereby the ratio of parts the $AT_G$:$AT_S$ substantially remains constant on the clutch actuation.

Pushing a volume of hydraulic fluid into the pressure chamber 50 of the slave cylinder 20 causes the slave piston 22 in FIG. 1 to be displaced to the left so that the clutch 12 is released via the pressure rod 52 and the release lever 24 a way known per se. The slave force $F_N$ required for this and hence the required slave pressure $p_N$ to be applied in the pressure chamber 50 of the slave cylinder 20 changes, as already mentioned above, subject to the layout of the respective clutch 12 with the slave travel $s_N$ of the slave piston 22, which behaves proportionally to the volume increase $\Delta V_N$ of the slave cylinder 20. This clutch characteristic ($p_N = f(\Delta V_N)$) is shown in FIG. 4.

In order to ensure the "fail-safe" behaviour of the hydraulic actuating device 10, i.e. to ensure that the clutch 12 can also be released (particularly) if the adjusting unit 26 has broken down, for example due to a failure of the electrics, as far as the ratio of the volume fractions $AT_G$:$AT_S$ which are exerted by the master cylinder 14 or the adjusting unit 26, the hydraulic actuating is preferably laid out so that maximum volume $AT_{Smax}$ of hydraulic fluid contributed by means of the adjusting unit 26 is limited or, in other words, so that the maximum volume $AT_{Gmax}$ that may be displaced from the pressure chamber 34 of the master cylinder 14 by means of the master piston 16 is (particularly) sufficient to bring about a stroke or slave travel $s_N$ of the slave piston 22 such that the clutch 12 is released up to its so-called disengagement point AK (see FIG. 4) or to at least shortly before this post. Shortly before the disengagement point AK, only a fraction of the maximum transmissible torque is transferred by the clutch 12 so that here a gear change is possible in the transmission (not shown) even if only with the exertion of a certain amount of power. Normally, the disengagement point AK is approximately 70 to 75% of the maximum volume increase $\Delta V_{Nmax}$ of the slave cylinder 20, as shown in FIGS. 3 and 4 so that the ratio of the volume fractions $AT_G$:$AT_S$ should preferably be in the range from 70:30 to 75:25.

It should still be noted with regard to the first example of an embodiment that, in the case of wear of the clutch 12, there is no need to intervene in the control for the adjusting unit 26 by means of control unit C. In the event of wear of the clutch 12, there is a reduction in the thickness of the friction linings on the clutch disc 70. As a result, the pressure springs 66 push the release bearing 56 via the release mechanism 58 toward the left in FIG. 1. The result is that the slave piston 22 which is pressed via the release lever 24 and the pressure rod 52 in its resting position in FIG. 1 moves toward the right. Insofar, there is a reduction in the overall resting volume of the liquid column between the master piston 16 and the slave piston 22, whereby surplus hydraulic fluid in the basic setting of the master piston 16 is pressed through the tracking line 38 into the reservoir 40. Therefore, the only change is in the overall resting volume of the liquid column, i.e. an absolute volume which affects neither the volume displacement from the pressure chambers 34, 76 of the master cylinder 14 or the adjusting unit 26 nor the volume increase by the pressure chamber 50 of the slave cylinder 20, i.e. the relative volume changes during a clutch actuation. However, as is the case with conventional hydraulic actuating devices, the master force $F_G$ that needs to applied via the clutch pedal 18 to release the clutch 12 rises in line with the increased wear of the clutch 12 depending on its design. Insofar, neither is there any change in the pedal feel compared to conventional hydraulic actuating devices.

While with the first example of an embodiment, there is a hydraulic parallel connection between the master piston 16 and the adjusting piston 28, in the other examples of embodiments, the master piston 16 and the adjusting piston 28 are hydraulically connected in series. For example, with the second and third examples of embodiments, which are only described below insofar as they differ from the first example of an embodiment, the adjusting piston 28 is arranged between the master piston 16 and the slave piston 22, whereby the adjusting piston 28 divides the liquid column between the master piston 16 and the slave piston 22 into a master section between the master piston 16 and the adjusting piston 28 and a slave section between the adjusting piston 28 and the slave piston 22. Hereby, the impingement of force on the adjusting piston 28 enables the force acting on the slave section of the liquid column to be specifically increased via the transmission 30 driven by the electric motor M.

Figure 5:
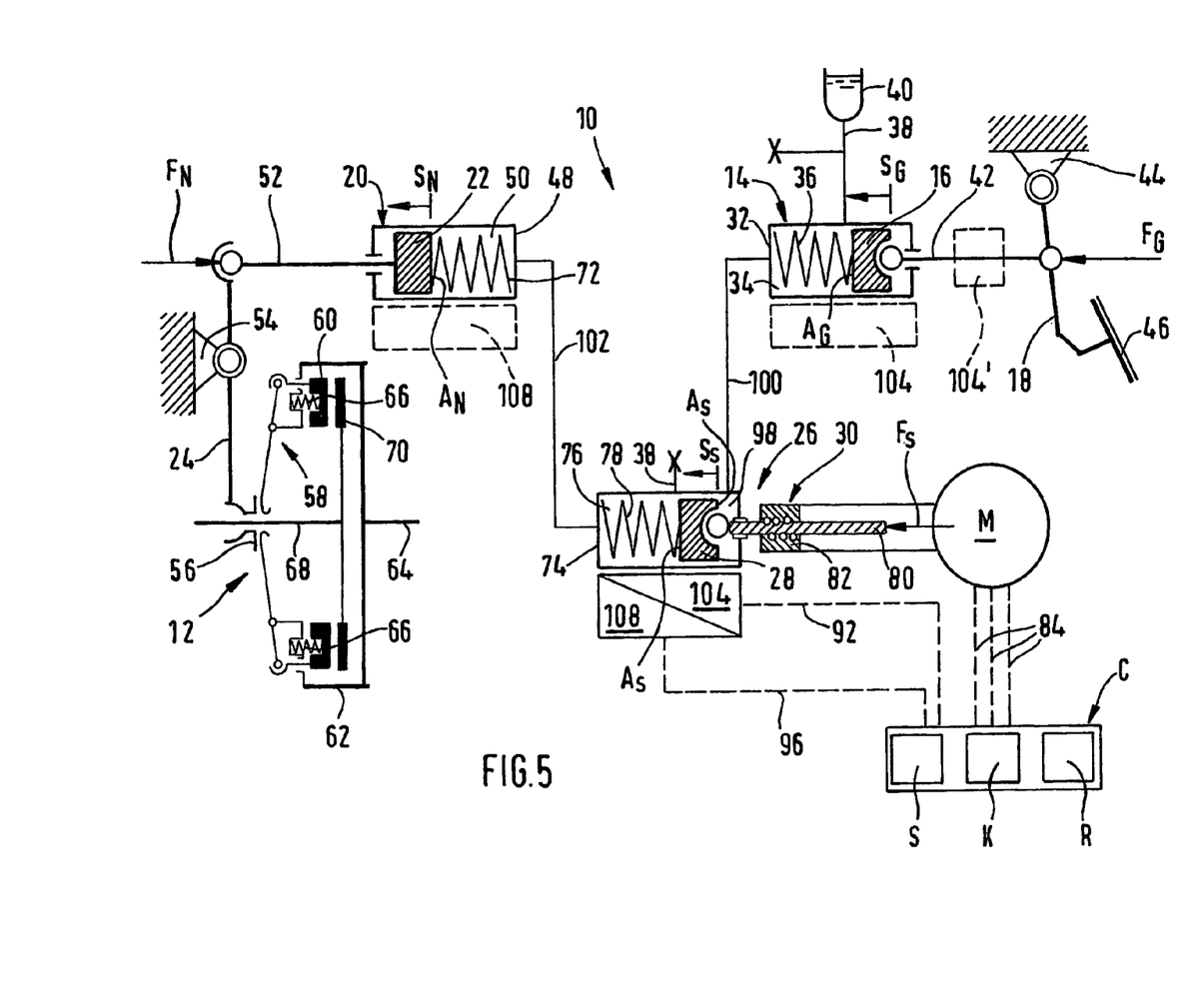
FIG. 5 is a circuit diagram of a hydraulic actuating device according to the invention for an automotive friction clutch according to a second example of an embodiment in which the master piston of the master cylinder is hydraulically connected in series to the adjusting piston of the electromechanical adjusting unit and the slave piston of the slave cylinder, whereby the adjusting piston is located between the master piston and the slave piston.
Figure 7:
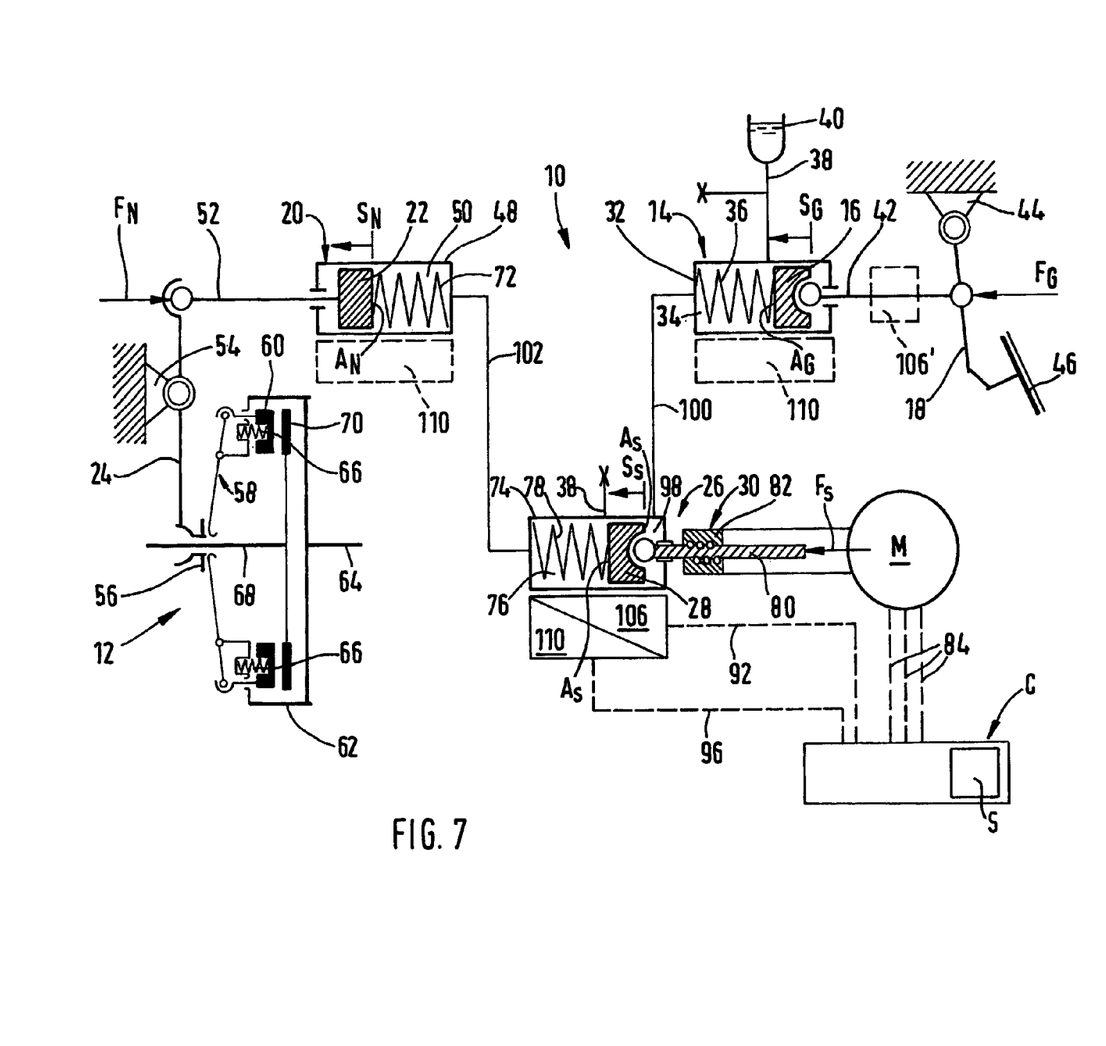
FIG. 7 is a circuit diagram of a hydraulic actuating device according to the invention for an automotive friction clutch according to a third example of an embodiment which only differs from the second example of an embodiment according to FIG. 5 with regard to the sensor design and the control principle.

As FIGS. 5 and 7 show, with the second and third example of an embodiment, neither the master cylinder 14 or the slave cylinder 20 nor the clutch 12 differ from the corresponding assemblies in the first example of an embodiment described with reference to FIG. 1. However, there are a few differences with the adjusting unit 26. Firstly, on its right-hand side in FIGS. 5 and 7, the adjusting piston 28 in the cylinder housing 74 delimits in a pressure-proof and variable way a second pressure chamber 98 into which the ball screw 80 extends in a suitably sealed manner. In addition, the adjusting piston 28 is pretensioned by means of the pretensioning spring 78 in a basic position in which the first pressure chamber 76 of the adjusting unit 26 is hydraulically connected to the reservoir 40 via a further tracking line 38 (indicated by "X" in FIGS. 5 and 7 for purposes of simplification). As a result, the two hydraulic circuits separated by the adjusting piston 28—the master section or the slave section of the liquid column between the master piston 16 and the slave piston 22—are aerated separately and volume changes in these hydraulic circuits are compensated separately.

In addition, the pressure chamber 34 of the master cylinder 14 is connected via a pressure line 100 to the second pressure chamber 98 of the adjusting unit 26 while its first pressure chamber 76 is connected via a further pressure line 102 to the pressure chamber 50 of the slave cylinder 20. It is evident that, on a clutch actuation, the master section of the liquid column will be displaced in the pressure line 100 while the slave section of the liquid column will be displaced in the other pressure line 102.

Once again with actuating devices 10 according to FIGS. 5 and 7, in each case sensor devices 104 or 106 and 108 or 110 are provided—of these, the first sensor device 104 or 106 serves to detect a variable representative of the respective actuation state of the master cylinder 14, while the second sensor device 108 or 110 serves to detect a variable which is different from the variable detected by means of the first sensor device 104 or 106, as will be explained in more detail. The first sensor device 104 or 106 is again connected via a signal line 92 to the control unit C, while the second sensor device 108 or 110 is connected via a another signal line 96 to the control unit C.

More precisely, with the second example of an embodiment according to FIG. 5, the second sensor device 108 is able to detect the slave pressure $p_{Nist}$ in the slave section of the liquid column which prevails in the pressure chamber 50 of the slave cylinder 20, in the pressure line 102 and in the first pressure chamber 76 of the adjusting unit 26 as a reference variable for the control of the electric motor M via the control unit C. On the other hand, the first sensor device 104 is able to detect the master pressure $p_{Gist}$ in the master section of the liquid column, which is present in the pressure chamber 34 of the master cylinder 14, in the pressure line 100 and in the second pressure chamber 98 of the adjusting unit 26 as a control variable. Preferably, the first sensor device 104 and the second sensor device 108 are provided jointly on the adjusting unit 26 so that, as an add-on group, this already has the sensors required for the control. According to the respective installation requirements, however, it is also conceivable as an alternative that corresponding pressure sensors 104, 108 are arranged on the master cylinder 14 or on the slave cylinder 20 (or in the pressure lines 100 or 102) as indicated in FIG. 5 with dotted lines on the master cylinder 14 or on the slave cylinder 20. Another conceivable alternative to pressure detection in the master section of the liquid column is to detect as a control variable the master force $F_{Gist}$ for example by means of a force sensor 104' provided on the piston rod 42—this is also indicated in FIG. 5 with dotted lines.

Figure 6:
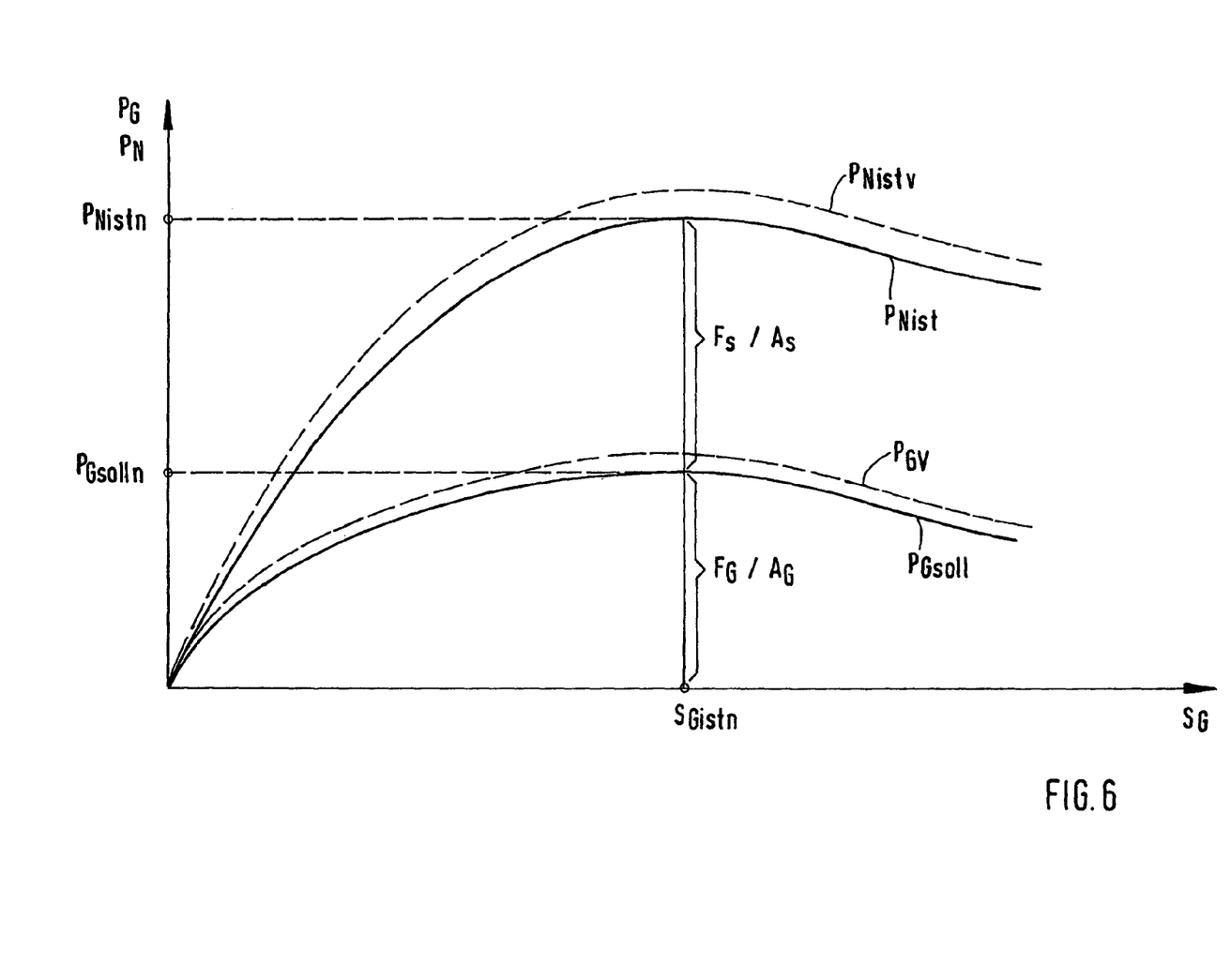
FIG. 6 is a diagram serving to explain the second example of an embodiment in which the master pressure $p_G$ prevailing in the master cylinder and the slave pressure $p_N$ prevailing in the slave cylinder is plotted as a function of the master travel $s_G$ of the master piston in the master cylinder.

As will be explained in more detail below with reference to FIG. 6, subject to the slave pressure $p_{Nist}$, a desired value for the master pressure $p_{Gsoll}$ (or the master force $F_{Gsoll}$) can be determined in the control unit C, whereupon the master pressure $p_{Gsoll}$ determined (or the master force $F_{Gsoll}$ determined) may be adjusted via the electric motor M controlled by the control unit C of the adjusting unit 26.

To this end, the control unit C again has a computation element R by means of which the desired value for the master pressure $p_{Gsoll}$ (or the master force $F_{Gsoll}$) can be determined according to the following relationship:

$$p_{Gsoll}=1/k_V * p_{Nist} \text{ or } F_{Gsoll}=A_G/k_V * p_{Nist}$$

where $p_{Nist}$: is the slave pressure in the slave section of the liquid column detected by the second sensor device 108
$k_V$: is an amplification factor stored in a storage element S of the control unit C and
$A_G$: is the hydraulic effective area of the master piston 16.

If, with the second example of an embodiment, the clutch pedal 18 is depressed by the operator in order to release the clutch 12, the master piston 16 pushes the master section of the liquid column between the master piston 16 and the adjusting piston 28, the adjusting piston 28, the slave section of the liquid column between the adjusting piston 28 and the slave piston 22 and the slave piston 22 in front of itself. During this, the master piston 16 crosses the connecting bore arranged in the cylinder housing 32 to the tracking line 38 connected to the reservoir 40, while the adjusting piston 28 crosses the connecting bore arranged in the cylinder housing 74 to the tracking line 38 connected to the reservoir 40. Subsequently, as a result of the master force $F_G$ applied by the operator and the resistance force of the clutch 12, the slave force $F_N$ and a master pressure $p_{Gist}$ are established in the master section of the liquid column and a slave pressure $p_{Nist}$ in the slave section of the liquid column. While the master pressure $p_{Gist}$ is detected by the first sensor device 104, the slave pressure $p_{Nist}$ is detected by the second sensor device 108. Using the slave pressure $p_{Nist}$ determined, a desired value for the master pressure $p_{Gsoll}$ is then determined in the control unit C by means of its computation element R according to the above relationship. Subsequently, the control unit C controls the electric motor M of the adjusting unit 26 until the actual value detected by the first sensor device 104 for the master pressure $p_{Gist}$ matches the respective specified desired value for the master pressure $p_{Gsoll}$. In other words, the adjusting unit 26 relieves the master section of the liquid column in a prespecified way so that only a moderate reaction force is perceptible at the clutch pedal 18 although a clutch 12 with a high resistance force, i.e. slave force $F_N$ is released.

For a prespecified master travel $s_{Gistn}$, the control unit C, or to be more precise its computation element R, therefore assigns to each slave pressure $p_{Nistn}$ a desired value for the master pressure $p_{Gsolln}$ which is to be adjusted by suitable control of the electric motor M by the control unit C as described. As a result, during a clutch actuation, the clutch characteristic is so-to-speak reported "compressed" to the clutch pedal 18, as shown in FIG. 6. If with a prespecified master travel $s_G$, a force equilibrium is formed at the adjusting piston 28, the following relationship is obtained:

$$F_{PN} = F_S + F_{PG}$$

whereby $$F_{PN} = p_N * A_S \text{ and } F_{PG} = p_G * A_S = F_G / A_G * A_S$$

where $A_S$ is the hydraulic effective area of the adjusting piston 28 (under the simplifying assumption that this is equal on both sides of the adjusting piston 28).

Consequently, at every point of the clutch characteristic, the slave pressure $p_N$ to be applied for the respective released or engaged status of the clutch 12 in the slave cylinder 20 is made up of a force component $F_G/A_G$ and an adjusting force component $F_S/A_S$. This is also illustrated in FIG. 6. This also shows that, if the adjusting unit 26 fails, for example due to the failure of the electric motor M ($F_S=0$), the slave pressure $p_N$ is to be applied solely via the master force $F_G$, i.e. by the operator. The layout of the hydraulic transmission ratio of the actuating device 10, i.e. the dimensioning of the hydraulic effective areas on the master piston 16, adjusting piston 28 and the slave piston 22 should, therefore, expediently be such that, in the event of the breakdown of the adjusting unit 26, the release of the clutch 12 is still possible with reasonable force.

It has already been mentioned that in the event of wear of the clutch 12, the slave force $F_N$ increases in accordance with the design of the clutch 12. Consequently, the actuating device 10 has to apply a higher slave pressure $p_N$ in order to release the clutch 12. In FIG. 6, another characteristic list $p_{Nistv}$ for a worn clutch 12 is plotted as a dotted line above the characteristic line $p_{Nist}$. If one and the same amplification factor $k_V$ were always to be expected in the control unit C, to be more precise in its computation element R, the clutch wear would also result in a higher desired value for the master pressure $p_{Gsoll}$ (see in FIG. 6, the curve drawn with a dotted line $p_{GV}$ above the master pressure curve $p_{Gsoll}$). During the adjustment of a increased desired value of this kind for the master pressure $p_{Gsollv}$, the operator would perceive a correspondingly increased reaction force on the clutch pedal 18 subject to the wear of the clutch 12. To avoid this, the control unit C preferably has a correction element K by means of which the amplification factor $k_V$ can be corrected subject to the wear of the clutch 12 in accordance with the following relationship:

$$k_V = k_{V0} * (p_{Nmax0} + \Delta p_{Nmax}) / p_{Nmax0}$$

whereby $$\Delta p_{Nmax} = p_{Nmaxist} - p_{Nmax0}$$

where $k_{V0}$ is a fixed amplification factor stored in the storage element S of the control unit C for an non-worn clutch 12, $p_{Nmax0}$ is a fixed value stored in the storage element S of the control unit C for a maximum slave pressure in the slave section of the liquid column with a non-worn clutch 12, and $p_{Nmaxist}$ is the maximum slave pressure detected in the slave section of the liquid column by the second sensor device 108 during a clutch actuation the control unit C "remembers" by storing it in the storage element S.

Consequently, increasing wear of the clutch 12 is accompanied by an increase in the amplification factor $k_V$ which has the result that, regardless of the wear of the clutch 12, the operator always perceives the same reaction force at the clutch pedal 18 when releasing or engaging the clutch 12. In other words, the wear-induced increase in the slave force $F_N$ is compensated by changed control of the adjusting unit 26. In this context, with regard to optimized control response, it is also conceivable only to adjust the amplification factor $k_a$ when the maximum slave pressure $p_{Nmaxist}$ detected in the slave section of the liquid column (optionally repeatedly) deviates by a prespecified amount from the fixed value $p_{Nmax0}$ for the slave pressure stored in the storage element S of the control unit C. As an alternative to the described procedure, it is obviously also always possible to use the pressure ratios in the master section of the liquid column for the adjustment of the amplification factor $k_V$—said ratios being detected by the first sensor device 104 (in the above relationship, then only the indices 'N' indicating the slave cylinder would have to be replaced by 'G' indicating the master cylinder).

Finally, with a second example of an embodiment, the control unit C can also be arranged so that different amplification factors $k_V$ are stored in its storage element S from which the operator can in each case select or preset one, for example by means of a preselector switch (not shown) in order to adjust the actuation feel of the actuating device 10 to the operator's individual requirements.

Figure 8:
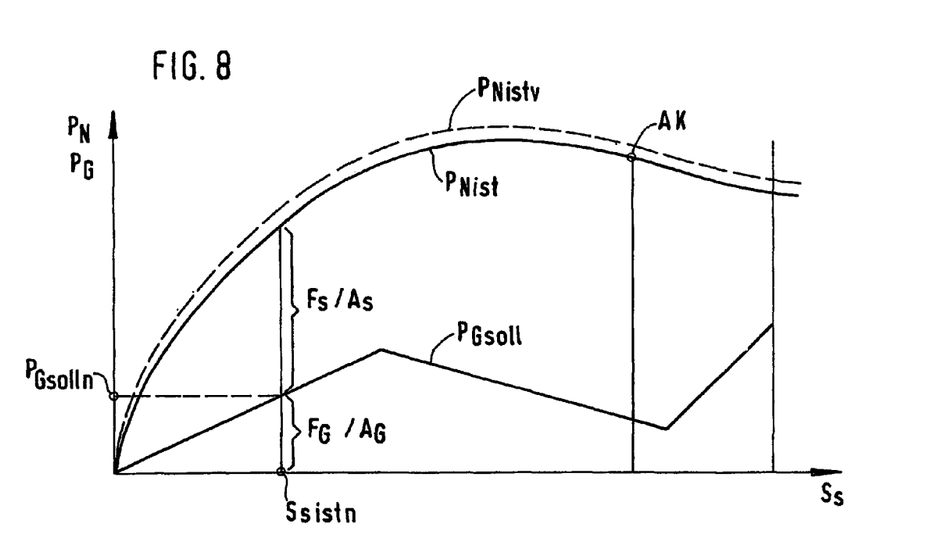
FIG. 8 is a diagram serving to explain the third example of an embodiment in which the slave pressure $p_N$ prevailing in the slave cylinder and a desired curve for the master pressure $p_G$ in the master cylinder stored in a storage element of a control unit are plotted as a function of the adjusting travel $s_S$ of the adjusting piston in the adjusting unit.

The following will describe the third example of an embodiment with reference to FIG. 7 and 8 only insofar that it differs from the previous examples of embodiments. In this context, it was mentioned in the introduction that the third example of an embodiment according to FIG. 7 differs from the second example of an embodiment according to FIG. 5 with respect to the sensors and the control principle. For example, with the third example of an embodiment the second sensor device 110 can detect the adjusting travel $s_{Sist}$ of the adjusting piston 28—or alternatively the slave travel $s_{Gist}$ of the slave piston 22 or the master travel $s_{Gist}$ of the master piston 16 as indicated in FIG. 7 by the hatched boxes below the master cylinder 14 or the slave cylinder 20—as a reference variable. On the other hand, the first sensor device 106 serves once again to detect the master pressure $p_{Gist}$ in the master section of the liquid column as a control variable. As an alternative to this, it is also possible to detect the master force $F_{Gist}$ as control variable, for example by means of a force sensor 106' provided on the piston rod 42 (see FIG. 7).

With the third example of an embodiment, subject to the adjusting travel $s_{Sist}$ of the adjusting piston 28 (or slave travel $s_{Nist}$ of the slave piston 22 or master travel $s_{Gist}$ of the master piston 16), a desired value for the master pressure $p_{Gsoll}$ (or the master force $F_{Gsoll}$) can now be determined in the control unit C, whereupon the master pressure $p_{Gsoll}$ determined (or the master force $F_{Gsoll}$ determined) may be adjusted via the electric motor M of the adjusting unit 26 which is controlled by the control unit C as already described above. Hereby, the control unit C once again has a storage element S but in which now a desired sequence ($p_{Gsoll} = f(s_{Sist})$, $p_{Gsoll} = f(s_{Nist})$, $p_{Gsoll}=f(s_{Gist})$, $F_{Gsoll}=f(s_{Sist})$, $F_{Gsoll}=f(s_{Nist})$ or $F_{Gsoll}=f(s_{Gist})$) of the control variable $p_G$ or $F_G$ is stored via the reference variable $s_S$, $s_N$ or $s_G$ from which an assigned desired value for the control variable $p_{GSoll}$ or $F_{Gsoll}$ may be determined for every actual value for the reference variable $s_{Sist}$, $s_{Nist}$ or $s_{Gist}$ detected by means of the second sensor device 110.

This is illustrated in FIG. 8 for the sensor arrangement 106, 110 according to FIG. 7, whereby the desired curve $p_{Gsoll}=f(s_{Sist})$ in the example of an embodiment shown is made up of three lines with different gradients and reversing signs so that, on a clutch actuation, the reaction force perceptible at the clutch pedal 18 first rises and then falls slightly before, after crossing the disengagement point AK, indicating the end of the release process by a relatively sharp rise.

As with the second example of an embodiment, with the third example of an embodiment, when the clutch pedal 18 is depressed by the operator the master piston 16 pushes the master section of the liquid column between the master piston 16 and the adjusting piston 28, the adjusting piston 28, the slave section of the liquid column between the adjusting piston 28 and the slave piston 22 and the slave piston 22 in front of it, whereby the master piston 16 or the adjusting piston 28 separates the hydraulic connection of the respective pressure chamber 34 or 76 with the reservoir 40 so that once again a master pressure $p_G$ or slave pressure $p_N$ is established in the respective section of the liquid column. The adjusting travel $s_{Sist}$ covered at this time by the adjusting piston 28—shown by way of example in FIG. 8 for an arbitrary time and indicated by $s_{Sistm}$—is detected by means of the second sensor device 110 and fed via the signal line 96 to the control unit C. In the control unit C the desired value for the master pressure $p_{Gsolln}$ assigned to the respecting adjusting travel is then determined. This desired value $p_{Gsolln}$ is then compared in the control unit C with the current actual value for the master pressure $p_{Gistm}$ detected by means of the first sensor device 106. If here there is a deviation between the actual value and the desired value, for example, if the current actual value for the master pressure $p_{Gistm}$ is, higher than the desired value determined for the master pressure $p_{Gsolln}$, the control unit C controls the electric motor M of the adjusting unit 26 in order to correct this deviation; in the example shown, the adjusting unit 26 would therefore relieve the pressure of the master section by the application of a adjusting force $F_s$ at the adjusting piston 28.

It is evident that via the clutch pedal 18, the operator only perceives a reaction force corresponding to the desired curve $p_{Gsoll}=f(s_{Sist})$ stored in the storage element S of the control unit, while the adjusting unit 26 contributes quasi automatically the required adjusting force component $F_S/A_S$ to the master force component $F_G/A_G$ for the respective release state of the clutch 12 applied by the operator (see FIG. 8). In the case of wear of the clutch 12, during which, as already mentioned, the slave force $F_N$ and hence the slave pressure $p_N$ rises (see the dotted wear curves $p_{NistV}$ or $F_{NistV}$ in FIG. 8 or 10), with the third example of an embodiment there is consequently also no need to intervene in the controls of the adjusting unit 26, instead the wear is automatically compensated by the adjusting unit 26 by means of force. However, this requires the adjusting unit 26 to be designed so it is able to contribute the required adjusting force component for the respective release state of the clutch 12. Otherwise, as with the second example of an embodiment, in the event of the failure of the adjusting unit 26, the operator would have to apply the force required to release the clutch 12 by purely manual means, which should also be taken into account when dimensioning the adjusting unit 26 and selecting the hydraulic ratios in the actuating device 10.

It should also be noted with regard to the third example of an embodiment that it is also possible to store other desired curves which are independent of the clutch characteristic $p_{Nist}$ or $F_{Nist}$ ($p_{Gsoll}=f(s_{Sist})$, $p_{Gsoll}=f(s_{Nist})$, $p_{Gsoll}=f(s_{Gist})$, $F_{Gsoll}=f(s_{Sist})$, $F_{Gsoll}=f(s_{Nist})$ or $F_{Gsoll}=f(s_{Gist})$) for the desired reaction variable ($p_G$ or $F_G$) of which the operator can in each case select or preset one in order to match the actuation feel and the actuating device 10 to the individual conceptions of the operator.

Figure 9:
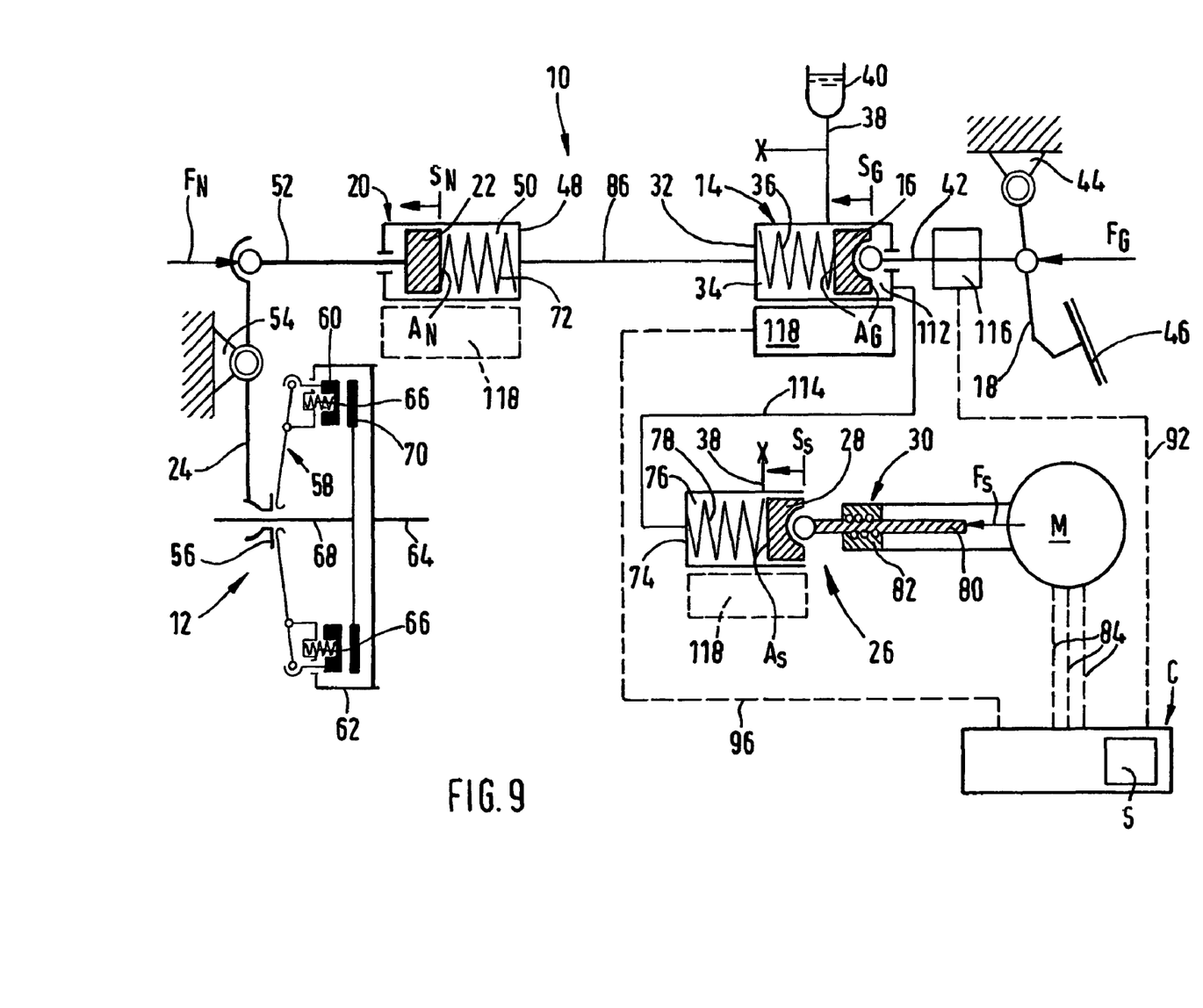
FIG. 9 is a circuit diagram of a hydraulic actuating device according to the invention for an automotive friction clutch according to a fourth example of an embodiment in which the master piston of the master cylinder is hydraulically connected in series to the adjusting piston of the electromechanical adjusting unit and the slave piston of the slave cylinder, whereby the master piston is located between the adjusting piston and the slave piston.
Figure 10:
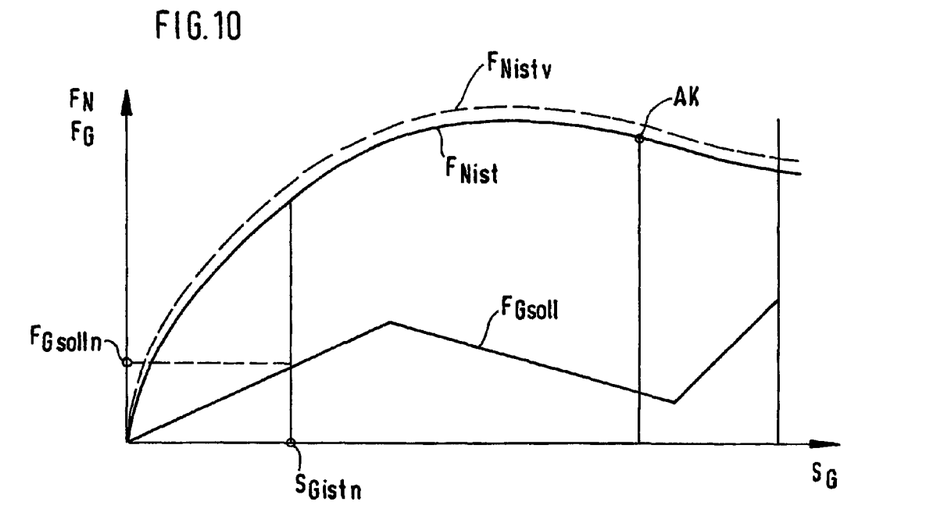
FIG. 10 is a diagram serving to explain the fourth example of an embodiment in which the slave force $F_N$ acting on the slave cylinder and a desired curve for the master force acting $F_G$ acting on the master cylinder are plotted as a function of the master travel $s_G$ of the master piston in the master cylinder.

The fourth example of an embodiment of the actuating device 10 shown in FIG. 9 primarily differs from the examples of embodiments described above in the interconnection of the individual components. However, the sensors and the control principle in the fourth example of an embodiment are comparable to the sensors and the control principle in the third example of an embodiment so that the statements made in this regard can be kept correspondingly short.

According to FIG. 9, the master piston 16 is now arranged for the connection in series of the master piston 16 and the adjusting piston 28 between the adjusting piston 28 and the slave piston 22, whereby the master piston 16 divides the liquid column between the adjusting piston 28 and the slave piston 22 into a servo section between the adjusting piston 28 and master piston 16 and a pressure section between the master piston 16 and the slave piston 22. With this example of an embodiment, therefore, the impingement of force from the adjusting piston 28 via the transmission 30 driven by means of the electric motor M of the adjusting unit 26 can specifically increase the force acting on the pressure section of the liquid column indirectly via the servo section of the liquid column.

Consequently, as described with the first example of an embodiment with reference to FIG. 1, the adjusting unit 26 once again has only one pressure chamber 76, although, unlike the first example of embodiment, due to the separation of the circuit by means of the master piston 16, in the spring-pretensioned basic setting of the adjusting piston 28, this communicates with the reservoir 40 via the tracking line 38. The master cylinder 14 on the other hand has, on the right side of the master piston 16 in FIG. 9, another pressure chamber 112, which is delimited by the master piston 16 in a pressure-tight and variable way. The piston rod 42 extends suitably into the pressure chamber 112 so that its left end in FIG. 9 lies in a way suitable for actuation on the master piston 16. While the pressure chamber 50 in the slave cylinder 20 is connected to the first pressure chamber 34 in the master cylinder 14 via the pressure line 86, another pressure line 114 connects the second pressure chamber 112 of the master cylinder 14 with the pressure chamber 76 of the adjusting unit 26.

In the fourth example of an embodiment, the second sensor device 118 serves to detect the master travel $s_{Gist}$ of the master piston 16 as a reference variable. Alternatively to this—as with the third example of an embodiment—depending upon the respective installation requirements, however, the second sensor device 118 could also detect the slave travel $s_{Nist}$ of the slave piston 22 or the adjusting travel $s_{Sist}$ of the adjusting piston 28 as a reference variable. This is indicated in FIG. 9 by the hatched box under the slave cylinder 20 or the adjusting unit 26. On the other hand, the first sensor device 116 can detect the master force $F_{Gist}$ as a control variable, which as shown in FIG. 9 can be performed by a force sensor—directly, for example by a piezoelement, or indirectly, for example by a strain gauge—on the piston rod 42.

Similarly to the third example of an embodiment, in the fourth example of an embodiment, in addition, a desired value for the master force can be determined in the control unit C subject to the master travel $s_{Gist}$ detected (or slave travel $s_{Nist}$ or adjusting travel $s_{Sist}$) whereupon the master force $F_{Gsoll}$ may be adjusted via the electric motor M of the adjusting unit 26 controlled by the control unit C. Hereby, once again the control unit C is provided with a storage element S in which a desired curve ($F_{Gsoll}=f(s_{Gist})$ or $F_{Gsoll}=f(s_{Nist})$ or $F_{Gsoll}=f(s_{Sist})$) for the control variable, i.e. the master force $F_G$ is stored via the reference variable, i.e. the master travel $s_G$ (or slave travel $s_N$ or adjusting travel $s_S$) (see FIG. 10).

As a result, as with the third example of an embodiment, in this way, a specific desired value for the control variable $F_{Gsoll}$ is assigned to each actual value for the reference variable $s_{Gist}$ (or $s_{Nist}$ or $s_{Sist}$) determined by means of the second sensor device 118. If the detected value pair $F_{Gsoll}/s_{Gist}$ deviates from the detected value pair $F_{Gist}/s_{Gist}$, the control unit C controls the electric motor M of the adjusting unit 26 until there is no longer any deviation.

It is evident to a person skilled in that art that in principle, it is also possible to use sensors other than those described so far and shown in the diagrams without leaving the framework of the invention. For example, instead of the stroke travels $s_G$, $s_N$ or $s_S$ of the piston, i.e. the mentioned travel variables, it is also possible to detect and suitably evaluate variables proportional to this, for example (1) by means of an angle sensor on the clutch pedal 18 for the detection of the angle of the clutch pedal 18 relative to the pedal bracket 44, which is in turn representative of the master travel $s_G$, (2) by means of an angle sensor on the release lever 24 for the detection of the angle of the release lever 24 relative to the relay link 54, which is representative of the slave travel $s_N$, and/or (3) by means of a rotational position sensor on the spindle nut 82 of the transmission 30, from whose signals with a known inclination of the ball screw 80 it is possible to draw conclusions regarding the adjusting travel $s_S$ of the adjusting piston 28.

A hydraulic actuating device for an automotive friction clutch is disclosed with a master cylinder, whose master piston can be impinged upon with a master force via an actuating mechanism and can be displaced by a master travel and a slave cylinder with a slave piston which is hydraulically connected in series to the master piston via a liquid column and is functionally linked with a clutch-release member of the automotive friction clutch. According to the invention, an adjusting unit is provided which in one variant has an adjusting piston hydraulically connected in series to the master piston which can be impinged upon with a force and displaced by via a transmission that is driven by an electric motor and a control unit which is used to the control the adjusting unit especially subject to a master variable in order to increase the force acting on the liquid column by impinging the adjusting piston with a force. As a result a simple, compact actuating device is provided which can also be used to actuate clutches that have large dimensions without this resulting in a different pedal feel than that obtained with conventional actuating devices.

Other variations and modifications are possible without departing from the scope and spirit of the present invention as defined by the appended claims.

We claim:

1. A hydraulic actuating device for an automotive friction clutch comprising:
    a master cylinder having a master piston, which can be subjected to a master force ($F_G$) via an actuating mechanism and can be displaced by a master travel ($s_G$) as master variables, and
    a slave cylinder with a slave piston which is hydraulically connected in series to the master piston said slave piston being actually connected to a clutch-release member of the automotive friction clutch,
    an adjusting unit which has an adjusting piston which can be subjected to a force and displaced via a transmission that is driven by an electric motor,
    is arranged in series between the master piston and the slave piston so that the force acting on the slave portion of the liquid column can be increased in a defined manner by subjecting the adjusting piston to force via the transmission,
    and divides the liquid column between the master piston and the slave piston into a master portion between the master piston and the adjusting piston and a slave portion between the adjusting piston and the slave piston,
    a control unit that controls the electric motor,
    a first sensor device which is signal-connected to the control unit and by which a master pressure ($p_{Gactual}$) in the master portion of the liquid column or the master force ($F_{Gactual}$) can be detected as control variable, and a second sensor device which is signal-connected to the control unit and by which a slave travel ($s_{Nactual}$) of the slave piston, an adjusting travel ($s_{sactual}$) of the adjusting piston, the master travel ($s_{Gactual}$) of the master piston or a variable proportional thereto can be detected as guide variable, wherein the control unit as a memory element in which a desired curve ($p_{Gnominal}=f(s_{Sactual})$; $F_{Gnominal}=f(s_{Gactual})$) of the control variable ($p_G$; $F_G$) relative to the guide variable ($s_N$; $s_S$; $s_G$) is stored, from which an associated nominal value for the control variable ($p_{Gnominal}$; $F_{Gnominal}$) can be determined for each actual value of the guide variable ($s_{Nactual}$; $s_{Sactual}$; $s_{Gactual}$) detected by the second sensor device, so that a nominal value for the master pressure ($p_{Gnominal}$) or the master force ($F_{Gnominal}$) can be determined in the control unit as a function of the detected slave travel ($S_{Nactual}$), adjusting travel ($s_{sactual}$), master travel ($s_{Gactual}$) or the detected variable proportional thereto, and wherein the determined master pressure ($p_{Gnominal}$) or the determined master force ($F_{Gnominal}$) can be set via the electric motor of the adjusting unit which is controlled by the control unit.

2. An actuating device for a motor vehicle friction clutch, comprising a master cylinder, the master piston of which, via an actuating member, can be subjected to a master force ($F_G$) and can be displaced by a master travel ($s_G$) as master variables, a slave cylinder which has a slave piston hydraulically connected in series to the master piston, said slave piston being actively connected to a clutch-release member of the motor vehicle friction clutch, an adjusting unit which has an adjusting piston which can be subjected to force and displaced via a transmission that is driven by an electric motor, wherein the master piston is arranged between the adjusting piston and the slave piston for the hydraulic series connection of the master piston and the adjusting piston and divides a liquid column between the adjusting piston and the slave piston into a servo portion between the adjusting piston and the master piston and a pressure portion between the master piston and the slave piston, a control unit, by which the electric motor can be controlled, so that the force acting on the pressure portion of the liquid column can be increased in a defined manner by subjecting the adjusting piston to force via the transmission, a first sensor device which is signal-connected to the control unit and by which the master force ($F_{Gactual}$) can be detected as control variable, and a second sensor device which is signal-connected to the control unit and by which a slave travel ($S_{Nactual}$) of the slave piston, the master travel ($s_{Gactual}$) of the master piston, an adjusting travel ($s_{Sactual}$) of the adjusting piston or a variable proportional thereto can be detected as guide variable, wherein the control unit has a memory element in which a desired curve ($F_{Gnominal}=f(s_{Gactual})$) of the control variable ($F_G$) relative to the guide variable ($s_N$; $s_G$; $s_S$) is stored, from which an associated nominal value for the control variable ($F_{Gnominal}$) can be determined for each actual value of the guide variable ($s_{Nactual}$; $s_{Gactual}$; $s_{Sactual}$) detected by the second sensor device, so that a nominal value for the master force ($F_{Gnominal}$) can be determined in the control unit as a function of the detected slave travel ($s_{Nactual}$), master travel ($s_{Gactual}$), adjusting travel ($s_{Sactual}$) or the detected variable proportional thereto, and wherein the determined master force ($F_{Gnominal}$) can be set via the electric motor of the adjusting unit which is controlled by the control unit.

3. An actuating device according to claim 1, wherein the master piston is biased by a return spring into a basic position in which a pressure chamber of the master cylinder is hydraulically connected to a reservoir.

4. An actuating device according to claim 3, wherein the adjusting piston is also biased by a biasing spring into a basic position in which a pressure chamber of the adjusting unit is hydraulically connected to a reservoir.

5. An actuating device according to claim 4, wherein the transmission of the adjusting unit is a spindle drive.

6. An actuating device according to claim 5, wherein the electric motor of the adjusting unit is a brushless DC motor.

7. An actuating device according to claim 2, wherein the master piston is biased by a return spring into a basic position in which a pressure chamber of the master cylinder is hydraulically connected to a reservoir.

8. An actuating device according to claim 7, wherein the adjusting piston is also biased by a biasing spring into a basic position in which a pressure chamber of the adjusting unit is hydraulically connected to a reservoir.

9. An actuating device according to claim 8, wherein the transmission of the adjusting unit is a spindle drive.

10. An actuating device according to claim 9, wherein the electric motor of the adjusting unit is a brushless DC motor.

11. An actuating device for an automotive friction clutch, with a master cylinder, the master piston of which can be impinged upon with a master force ($F_G$) and can be displaced by a master travel ($S_G$) as master variables via an actuating member, a slave cylinder comprising a slave piston which is hydraulically connected in series to the master piston via a liquid column, and which is functionally linked with a clutch-release member of the automotive friction clutch, wherein the master cylinder is hydraulically connected to the slave cylinder by a first pressure line, in which the liquid column between the master piston and the slave piston is displaceable,
  an adjusting unit comprising an adjusting piston hydraulically connected parallel to the master piston, which can be impinged upon with a force and displaced via a transmission that can be driven by an electric motor, wherein, for parallel connection of the master piston and the adjusting piston, the adjusting unit is hydraulically connected via a second pressure line to the first pressure line,
  a control unit, by which the electric motor can be controlled, so that by displacement of the adjusting piston via the transmission the volume of the liquid column between the master piston and the slave piston can be increased in a defined manner,
  a first sensor device with a signal connection to the control unit, by which the master travel ($S_{Gist}$) can be detected as a reference value,
  a second sensor device with a signal connection to the control unit, by which an adjusting travel ($S_{Sist}$) of the adjusting piston or a slave travel ($S_{Nist}$) of the slave piston can be detected as a control variable, and
  wherein the control unit comprises a computation element, by which a desired value for the adjusting travel ($S_{Ssoll}$) or the slave travel ($S_{Nsoll}$) can be determined according to the following relationship: S Ssoll=k U ss S Gist or S Nsoll=k U ss S Gist $$S_{Ssoll}=k_U{}^*S_{Gist} \text{ or } S_{Nsoll}=k_U{}^*S_{Gist}$$

where
$S_{Gist}$ is the master travel of the master piston detected by the first sensor device and $k_U$ is a transformation factor stored in a storage element of the control unit, and wherein the adjusting travel ($S_{Ssoll}$) or slave travel ($S_{Nsoll}$) determined can be adjusted via the electric motor of the adjusting unit which is controlled by the control unit.

12. An actuating device according to claim 11, wherein the transformation factor ($k_U$) is constant.

13. An actuating device according to claim 12, wherein the master piston is pretensioned in a basic position by a return spring, in which position the pressure chamber of the master cylinder is hydraulically connected to a reservoir.

14. An actuating device according to claim 11, wherein the transmission of the adjusting unit is a spindle drive.

15. An actuating device according to claim 11, wherein the electric motor of the adjusting unit is a brushless DC motor.

16. An actuating device for an automotive friction clutch, with a master cylinder, the master piston of which can be impinged upon with a master force ($F_G$) and can be displaced by a master travel ($s_G$) as master variables via an actuating member, a slave cylinder comprising a slave piston which is hydraulically connected in series to the master piston, and which is functionally linked with a clutch-release member of the automotive friction clutch,
  an adjusting unit comprising an adjusting piston which can be impinged upon with a force and displaced via a transmission that can be driven by an electric motor, which, for a connection in series of the master piston and the adjusting piston, is arranged between the master piston and the slave piston, and which divides a liquid column between the master piston and the slave piston into a master section between the master piston and the adjusting piston and a slave section between the adjusting piston and the slave piston,
  a control unit, by which the electric motor can be controlled, so that by impinging a force upon the adjusting piston via the transmission the force acting on the slave section of the liquid column can be increased in a defined manner,
  a first sensor device with a signal connection to the control unit, by which a master pressure ($p_{Gist}$) in the master section of the liquid column or the master force ($F_{Gist}$) can be detected as a control variable,
  a second sensor device with a signal connection to the control unit, by which a slave pressure ($p_{Nist}$) in the slave section of the liquid column can be detected as a reference value, wherein the control unit comprises a computation element by which a desired value for the master pressure ($p_{Gsoll}$) or the master force ($F_{Gsoll}$) can be determined according to the following relationship:

$$p_{Gsoll}=1/k_V{}^*p_{Nist} \text{ or } F_{Gsoll}=A_G/k_V{}^*p_{Nist}$$

where
$p_{Nist}$: is the slave pressure in the slave section of the liquid column detected by the second sensor device,
$k_v$: is an amplification factor stored in a storage element of the control unit and $A_G$: is the hydraulic effective area of the master piston, wherein the control unit further has a correction element by which, with an increasing wear of the clutch, the amplification factor ($k_v$) can be increased in a defined manner, so that an operator, upon engaging or disengaging the clutch, always perceives the same reaction force response on the actuating member, independent of the clutch wear, and wherein the master pressure ($p_{Gsoll}$) determined or the master force ($F_{Gsoll}$) determined can be adjusted via the electric motor of the adjusting unit which is controlled by the control unit.

17. An actuating device according to claim 16, wherein, by the correction element of the control unit, the amplification factor ($k_v$) can be corrected in accordance with the following relation subject to the clutch wear:

$$k_V = k_{V0} * (p_{Nmax0} + \Delta p_{Nmax})/p_{Nmax0}$$

wherein $$\Delta p_{Nmax} = p_{Nmaxist} - p_{Nmax0}$$

where $k_{v0}$ is a fixed amplification factor stored in the storage element of the control unit for an non-worn clutch, $p_{Nmax0}$ is a fixed value stored in the storage element of the control unit for a maximum slave pressure in the slave section of the liquid column with a non-worn clutch and $p_{Nmaxist}$ is the maximum slave pressure detected in the slave section of the liquid column by the second sensor device.

18. An actuating device according to claim 16, wherein the master piston is pretensioned in a basic position by a return spring, in which position the pressure chamber of the master cylinder is hydraulically connected to a reservoir.

19. An actuating device according to claim 18, wherein the adjusting piston is also pretensioned in a basic position by a pretensioning spring, in which position a pressure chamber of the adjusting unit is hydraulically connected to a reservoir.

20. An actuating device according to claim 16, wherein the transmission (of the adjusting unit is a spindle drive.

21. An actuating device according to claim 16, wherein the electric motor of the adjusting unit is a brushless DC motor.

* * * * *